United States Patent
Winter et al.

(10) Patent No.: US 12,509,993 B1
(45) Date of Patent: Dec. 30, 2025

(54) COMPOSITE AIRFOIL WITH INTEGRATED ANTI-ICING FOR AN AIRCRAFT PROPULSION SYSTEM

(71) Applicant: Raytheon Technologies Corporation, Farmington, CT (US)

(72) Inventors: Michael Winter, New Haven, CT (US); Becky E. Rose, Colchester, CT (US)

(73) Assignee: RTX Corporation, Farmington, CT (US)

( * ) Notice: Subject to any disclaimer, the term of this patent is extended or adjusted under 35 U.S.C. 154(b) by 53 days.

(21) Appl. No.: 18/100,297

(22) Filed: Jan. 23, 2023

Related U.S. Application Data

(60) Provisional application No. 63/301,821, filed on Jan. 21, 2022.

(51) Int. Cl.
 *F01D 5/14* (2006.01)
 *F01D 5/28* (2006.01)
 *F01D 25/02* (2006.01)

(52) U.S. Cl.
 CPC ............. *F01D 5/282* (2013.01); *F01D 5/147* (2013.01); *F01D 25/02* (2013.01); *F05D 2220/323* (2013.01); *F05D 2300/6012* (2013.01); *F05D 2300/603* (2013.01)

(58) Field of Classification Search
 CPC ........................ B64D 15/12; B64D 2033/0233; B64D 15/00; H05B 2203/017; H05B 2214/02; H05B 2203/013; H05B 3/347; H05B 2203/015; H05B 2203/033; H05B 3/345; F02C 7/047; F01D 25/02; F01D 5/282; F01D 5/18; F01D 17/16; F01D 25/10; F01D 9/00; F01D 5/147; F05D 2300/603; F05D 2300/5024; F05D 2300/601; F05D 2220/323; F05D 2300/6012
 See application file for complete search history.

(56) References Cited

U.S. PATENT DOCUMENTS

| | | | | |
|---|---|---|---|---|
| 2,496,279 A * | 2/1950 | Ely | ................. | B64D 15/12 219/202 |
| 2,932,719 A * | 4/1960 | Marguerita | ............ | H05B 3/347 219/545 |
| 4,386,749 A | 6/1983 | Sweet | | |
| 4,792,662 A * | 12/1988 | Kitagaki | ................ | H05B 3/342 219/547 |
| 5,422,462 A * | 6/1995 | Kishimoto | ............ | H05B 1/0272 219/545 |
| 5,925,275 A * | 7/1999 | Lawson | ................. | B64D 15/12 219/543 |
| 5,971,323 A * | 10/1999 | Rauch | .................... | B64D 15/12 219/202 |
| 6,832,742 B2 * | 12/2004 | Petrenko | ................ | B64D 15/12 205/628 |

(Continued)

*Primary Examiner* — Eric J Zamora Alvarez
(74) *Attorney, Agent, or Firm* — Getz Balich LLC

(57) ABSTRACT

An apparatus is provided for an aircraft propulsion system. This apparatus includes an airfoil and an electric heater. The airfoil includes a fiber-reinforced composite and an exterior surface. The fiber-reinforced composite includes a plurality of fibers embedded within a matrix. The electric heater includes an electric heating element. The electric heater is configured to melt and/or prevent ice accumulation on the exterior surface. The electric heating element is integrated with the fibers and embedded within the matrix.

18 Claims, 7 Drawing Sheets

(56) References Cited

U.S. PATENT DOCUMENTS

| | | | |
|---|---|---|---|
| 7,291,815 B2* | 11/2007 | Hubert | B64D 15/12 |
| | | | 219/535 |
| 7,789,620 B2* | 9/2010 | Vontell, Sr. | F04D 29/023 |
| | | | 415/178 |
| 9,004,407 B2* | 4/2015 | Calder | B64D 15/12 |
| | | | 219/202 |
| 9,562,443 B2* | 2/2017 | Roberts | F01D 17/02 |
| 9,708,929 B2* | 7/2017 | Szwedowicz | F01D 25/02 |
| 9,868,536 B2 | 1/2018 | Miller | |
| 10,457,402 B2 | 10/2019 | Seminel | |
| 11,084,593 B2 | 8/2021 | George | |
| 11,371,433 B2* | 6/2022 | Saripella | B32B 5/12 |
| 2010/0282458 A1* | 11/2010 | Ann | F24H 1/121 |
| | | | 219/535 |
| 2014/0070054 A1* | 3/2014 | Burton | B64D 15/12 |
| | | | 219/202 |
| 2018/0037328 A1 | 2/2018 | Houlihan | |
| 2020/0189754 A1* | 6/2020 | Jones | F01D 25/02 |
| 2023/0392549 A1* | 12/2023 | Sharma | F02C 7/047 |

\* cited by examiner

COMPOSITE AIRFOIL WITH INTEGRATED ANTI-ICING FOR AN AIRCRAFT PROPULSION SYSTEM

This application claims priority to U.S. Patent Appln. No. 63/301,821 filed Jan. 21, 2022, which is hereby incorporated herein by reference in its entirety.

BACKGROUND OF THE DISCLOSURE

1. Technical Field

This disclosure relates generally to an aircraft propulsion system and, more particularly, to anti-icing for a component of the aircraft propulsion system.

2. Background Information

Various types and configurations of composite airfoils are known in the art for an aircraft propulsion system. While these known composite airfoils have various advantages, there is still room in the art for improvement. For example, some composite airfoils are susceptible to icing during aircraft propulsion system operation. There is a need in the art therefore to reduce or prevent ice accumulation on a composite airfoil.

SUMMARY OF THE DISCLOSURE

According to an aspect of the present disclosure, an apparatus is provided for an aircraft propulsion system. This apparatus includes an airfoil and an electric heater. The airfoil includes a fiber-reinforced composite and an exterior surface. The fiber-reinforced composite includes a plurality of fibers embedded within a matrix. The electric heater includes an electric heating element. The electric heater is configured to melt and/or prevent ice accumulation on the exterior surface. The electric heating element is integrated with the fibers and embedded within the matrix.

According to another aspect of the present disclosure, an apparatus is provided for an aircraft propulsion system. This apparatus includes an airfoil and an electric heater. The airfoil includes an exterior surface, a matrix and a sheet of woven fibers within the matrix. The electric heater includes a conductive filament. The electric heater is configured to melt and/or prevent ice accumulation on the exterior surface. The conductive filament is integrated with the sheet of woven fibers and disposed within the matrix.

According to still another aspect of the present disclosure, a system is provided that includes an open rotor aircraft propulsion system. The open rotor aircraft propulsion system includes an airfoil and an electric heater. The airfoil is arranged at an exterior of the open rotor aircraft propulsion system. The airfoil includes an exterior surface. The electric heater is configured to melt and/or prevent ice accumulation on the exterior surface. The electric heater includes an electric heating element integrated with the airfoil.

The airfoil may also include a fiber-reinforced composite. The fiber-reinforced composite may include a plurality of fibers embedded within a matrix. The electric heating element may be integrated with the fibers and/or may be embedded within the matrix.

The electric heating element may be woven with the fibers into a weave. The weave may be embedded within the matrix.

The electric heating element may be integrated into a cloth formed from the fibers. The cloth may be embedded within the matrix.

The fibers may include a first fiber, a second fiber and a third fiber. The first fiber may be parallel with the second fiber. The third fiber may be parallel with the electric heating element. A first portion of the third fiber may be above and may cross the first fiber. A second portion of the third fiber may be below and may cross the second fiber. A first portion of the electric heating element may be below and may cross the first fiber. A second portion of the electric heating element may be above and may cross the second fiber.

The fibers may be woven together. The electric heating element may pass through an interstice between at least some of the fibers.

The electric heating element may be one of a plurality of electric heating elements integrated with the fibers and embedded within the matrix. A ratio of the fibers to the electric heating elements may be between 1:10 and 1:1000.

The electric heater may be configured to melt and/or prevent ice accumulation on the exterior surface along a length of a span of the airfoil. The length may be equal to or greater than seventy-five percent of the span.

The electric heater may be configured to melt and/or prevent ice accumulation on the exterior surface along a length of a span of the airfoil. The length may be less than seventy-five percent of the span.

The electric heater may be configured to melt and/or prevent ice accumulation on the exterior surface along a leading edge of the airfoil.

The electric heater may be configured to melt and/or prevent ice accumulation on the exterior surface along a pressure side of the airfoil.

The electric heating element may be configured as or otherwise include a conductive filament.

The fibers may include fiberglass fibers, carbon fibers and/or aramid fibers.

The matrix may be configured as or otherwise include a polymer matrix.

The airfoil may include a body and a protective coating over at least a portion of the body. The body may be configured from or otherwise include the fiber-reinforced composite. The protective coating may form the exterior surface.

A rotor blade may be included. The rotor blade may be configured as or otherwise includes the airfoil.

A guide vane may be included. The guide vane may be configured as or otherwise includes the airfoil.

The electric heating element may also be configured as a conductor for a lightening protection system.

The aircraft propulsion system may be configured as an open rotor aircraft propulsion system. The airfoil may be arranged at an exterior of the open rotor aircraft propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
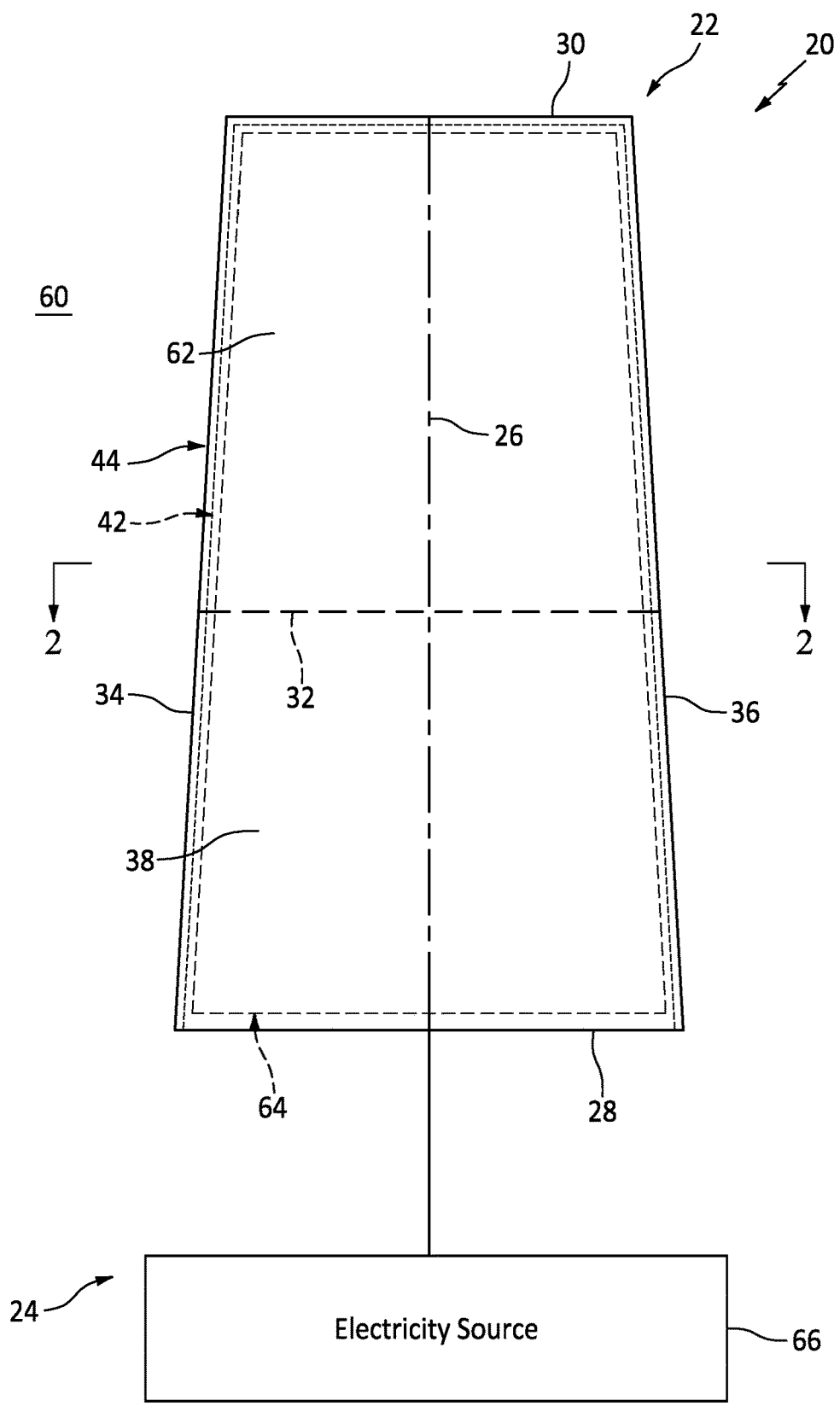
FIG. 1 is a schematic side illustration of an airfoil system.

FIG. 1 illustrates an airfoil system 20 for an aircraft propulsion system. This airfoil system 20 includes a composite airfoil 22 and a thermal anti-icing system 24.

Figure 2:
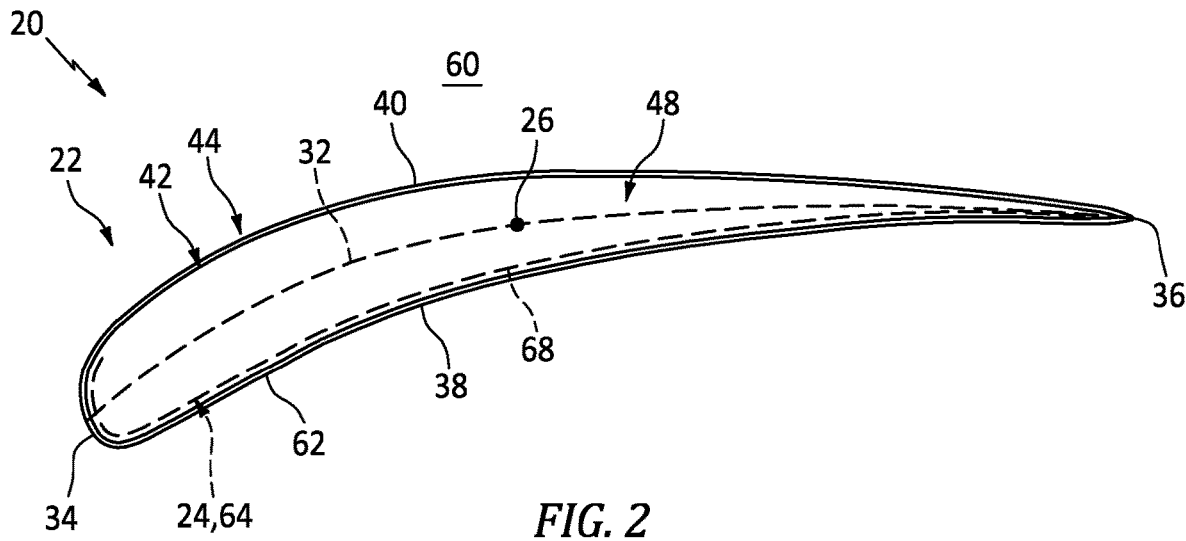
FIG. 2 is a schematic sectional illustration of a composite airfoil taken along line 2-2 in FIG. 1.

The composite airfoil 22 extends spanwise along a span 26 of the composite airfoil 22 from a base 28 of the composite airfoil 22 to a (e.g., unshrouded) tip 30 of the composite airfoil 22. The composite airfoil 22 extends longitudinally along a camber line 32 of the composite airfoil 22 between and to a leading edge 34 of the composite airfoil 22 and a trailing edge 36 of the composite airfoil 22. Referring to FIG. 2, the composite airfoil 22 extends laterally (e.g., widthwise) between and to a (e.g., concave) pressure side 38 of the composite airfoil 22 and a (e.g., convex) suction side 40 of the composite airfoil 22. Each of these airfoil sides 38 and 40 extends spanwise from the airfoil base 28 to the airfoil tip 30 (see FIG. 1). Each of the airfoil sides 38 and 40 extends longitudinally between and may meet at the airfoil leading edge 34 and the airfoil trailing edge 36.

The composite airfoil 22 of FIGS. 1 and 2 includes an airfoil body 42 and an exterior protective coating 44 over the airfoil body 42. The airfoil body 42 may be constructed form a fiber-reinforced composite; e.g., a fiber-reinforced polymer. The airfoil body 42 of FIG. 3, for example, includes one or more layers 46A-F (generally referred to as 46). Each of these body layers 46 may include reinforcement material 48 embedded within a matrix 50. The reinforcement material 48 may at least (or only) include fiberglass fibers, carbon fibers, aramid fibers and/or a combination of any one or more of the foregoing reinforcement material fibers. The matrix 50 may be formed from a polymer such as a thermoset epoxy. The present disclosure, however, is not limited to the foregoing exemplary reinforcement or matrix materials.

Figure 4:
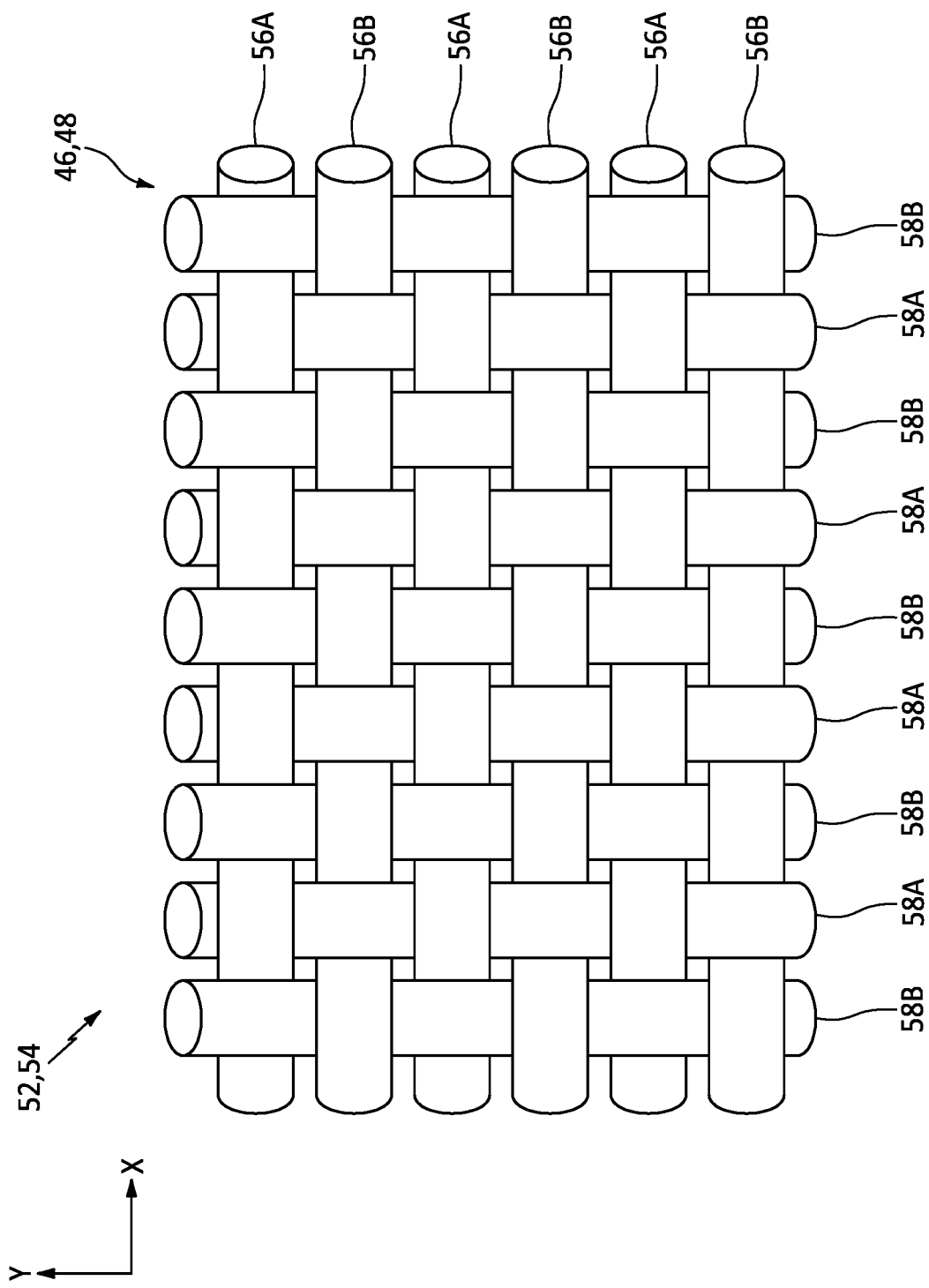
FIG. 4 is an illustration of a portion of a reinforcement material cloth.

Referring to FIG. 4, within one or more of the body layers 46, the reinforcement material fibers may be arranged together in a pattern. The reinforcement material fibers of FIG. 4, for example, are woven together into a weave 52 to provide a reinforcement material cloth 54. The reinforcement material cloth 54 of FIG. 4 includes one or more weft fibers (or yarns of fibers) 56A and 56B (generally referred to as 56) and one or more warp fibers (or yarns of fibers) 58A and 58B (generally referred to as 58) woven together, for example, in a plain weave.

The weft fibers 56 are angularly offset from (e.g., perpendicular to, acutely angled to, etc.) the warp fibers 58. Each of the weft fibers 56 of FIG. 4, for example, has a length that extend along an x-axis. Each of the warp fibers 58 has a length that extend along a y-axis.

The first weft fibers 56A are interposed with the second weft fibers 56B. Each of the first weft fibers 56A, for example, is located next to one or more of the second weft fibers 56B. Each of the second weft fibers 56B is located next to one or more of the first weft fibers 56A. Each of the first weft fibers 56A crosses above one or more or all of the first warp fibers 58A. Each of the first weft fibers 56A crosses below one or more or all of the second warp fibers 58B. On the other hand, each of the second weft fibers 56B crosses below one or more or all of the first warp fibers 58A. Each of the second weft fibers 56B crosses above one or more or all of the second warp fibers 58B.

The first warp fibers 58A are interposed with the second warp fibers 58B. Each of the first warp fibers 58A, for example, is located next to one or more of the second warp fibers 58B. Each of the second warp fibers 58B is located next to one or more of the first warp fibers 58A. Each of the first warp fibers 58A crosses below one or more or all of the first weft fibers 56A. Each of the first warp fibers 58A crosses above one or more or all of the second weft fibers 56B. On the other hand, each of the second warp fibers 58B crosses above one or more or all of the first weft fibers 56A. Each of the second warp fibers 58B crosses below one or more or all of the second weft fibers 56B.

The reinforcement material cloth 54 is described above with a plain weave. The present disclosure, however, is not limited to such an exemplary weave. The reinforcement material fibers (e.g., 56 and 58), for example, may alternatively be woven together in a twill weave, a satin weave, a rep weave, an oxford weave, a herringbone weave or various other types of weaves. These weaves may have a two-dimensional (2D) configuration. Alternatively, the reinforcement material fibers (e.g., 56 and 58) may be woven together in a three-dimensional (3D) weave.

Referring to FIGS. 1 and 2, the protective coating 44 is configured to provide a protective barrier between the airfoil body 42 and an environment 60 surrounding the composite airfoil 22. The protective coating 44 may partially or completely cover the airfoil body 42 at (e.g., on, adjacent or proximate) and/or along the airfoil tip 30, the airfoil leading edge 34, the airfoil trailing edge 36, the airfoil pressure side 38 and/or the airfoil suction side 40. The protective coating 44 may thereby form an exterior surface 62 of the composite airfoil 22, which airfoil exterior surface 62 is a surface which borders/is exposed to (e.g., contacts) the surrounding environment 60. The protective coating 44 of FIGS. 1 and 2 completely forms the airfoil exterior surface 62. However, in other embodiments, the airfoil exterior surface 62 may also be partially formed by the airfoil body 42 where one or more portions of the airfoil body 42 are uncovered/exposed to the surrounding environment 60. In still other embodiments, the airfoil exterior surface 62 may be completely formed by the airfoil body 42 where the protective coating 44 is omitted from the composite airfoil 22.

The protective coating 44 may include one or more layers. Each of these coating layers may be constructed from a common coating material. Alternatively, one or more of the coating layers may be constructed from a different coating material than one or more other coating layers. An example of the coating material is a lacquer; however, the present disclosure is not limited thereto.

The thermal anti-icing system 24 of FIG. 1 includes an electric heater 64 and an electricity source 66; e.g., a generator, a battery, a current regulator, an electrical harness, etc. The electric heater 64 is configured to melt and/or prevent ice accumulation on the airfoil exterior surface 62 of the composite airfoil 22. The electric heater 64, for example, includes one or more electric heating elements 68 (see FIGS. 2, FIGS. 5A and 5B) in the airfoil body 42 along and close to the airfoil exterior surface 62. Each of these electric heating elements 68 (see FIGS. 2, FIGS. 5A and 5B) may be configured as a conductive filament (e.g., a metal wire) with a select resistance. When electricity received from the electricity source 66 flows through the conductive filament, the conductive filament generates heat. This heat may be transferred via conduction through material of the composite airfoil 22 (e.g., the composite material, the coating material, etc.) to the airfoil exterior surface 62. The heat generated by the electric heater 64 and its electric heating elements 68 (see FIGS. 2, FIGS. 5A and 5B) may thereby melt ice that has accumulated on the airfoil exterior surface 62 and/or may prevent ice from accumulating on the airfoil exterior surface 62.

Figure 3:
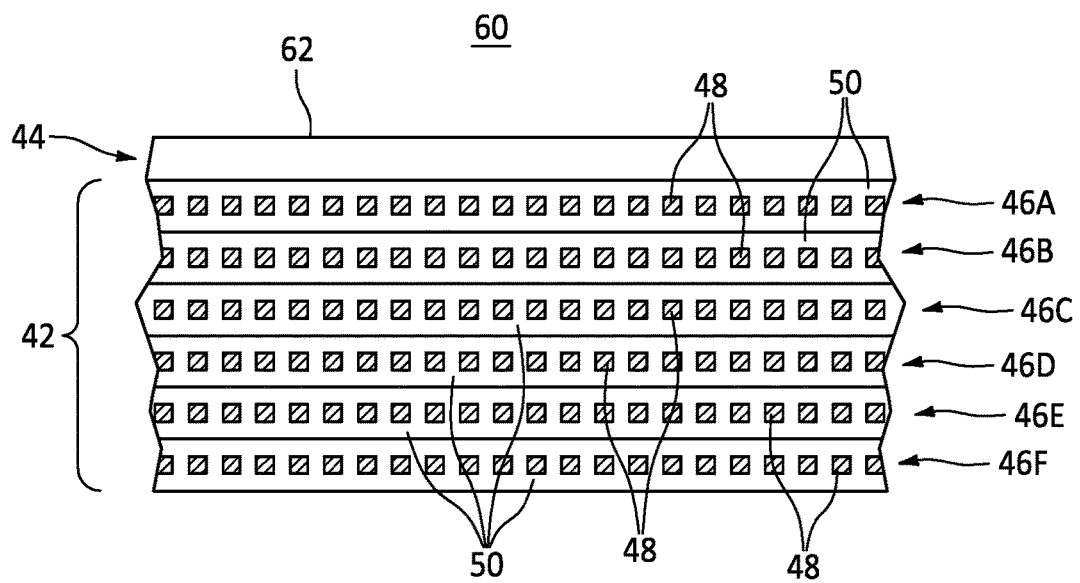
FIG. 3 is a schematic sectional illustration of a portion of the composite airfoil.
Figure 5A:
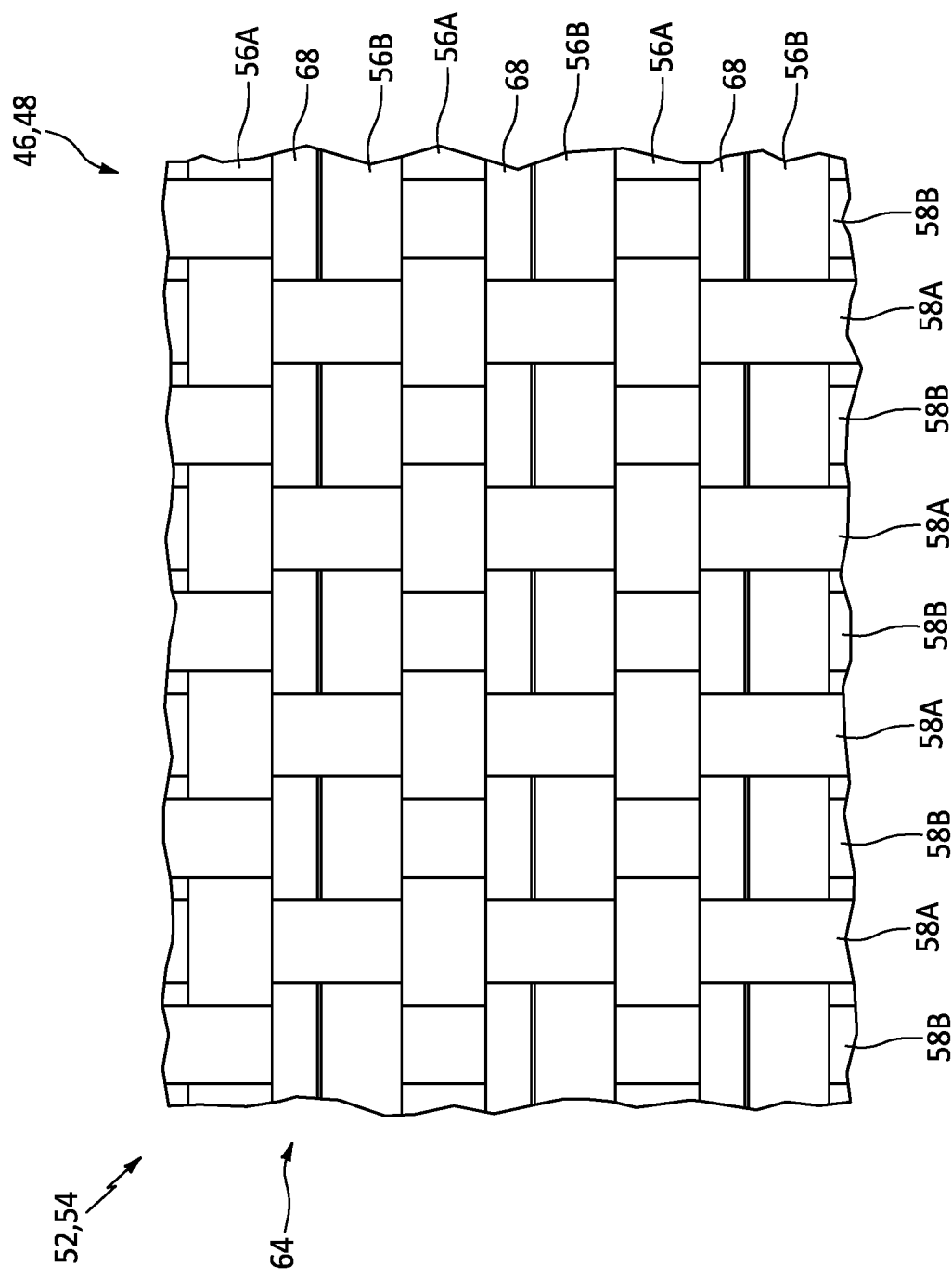
FIGS. 5A and 5B are illustrations of portions of various electric heating element arrangements integrated into the reinforcement material cloth.
Figure 5B:
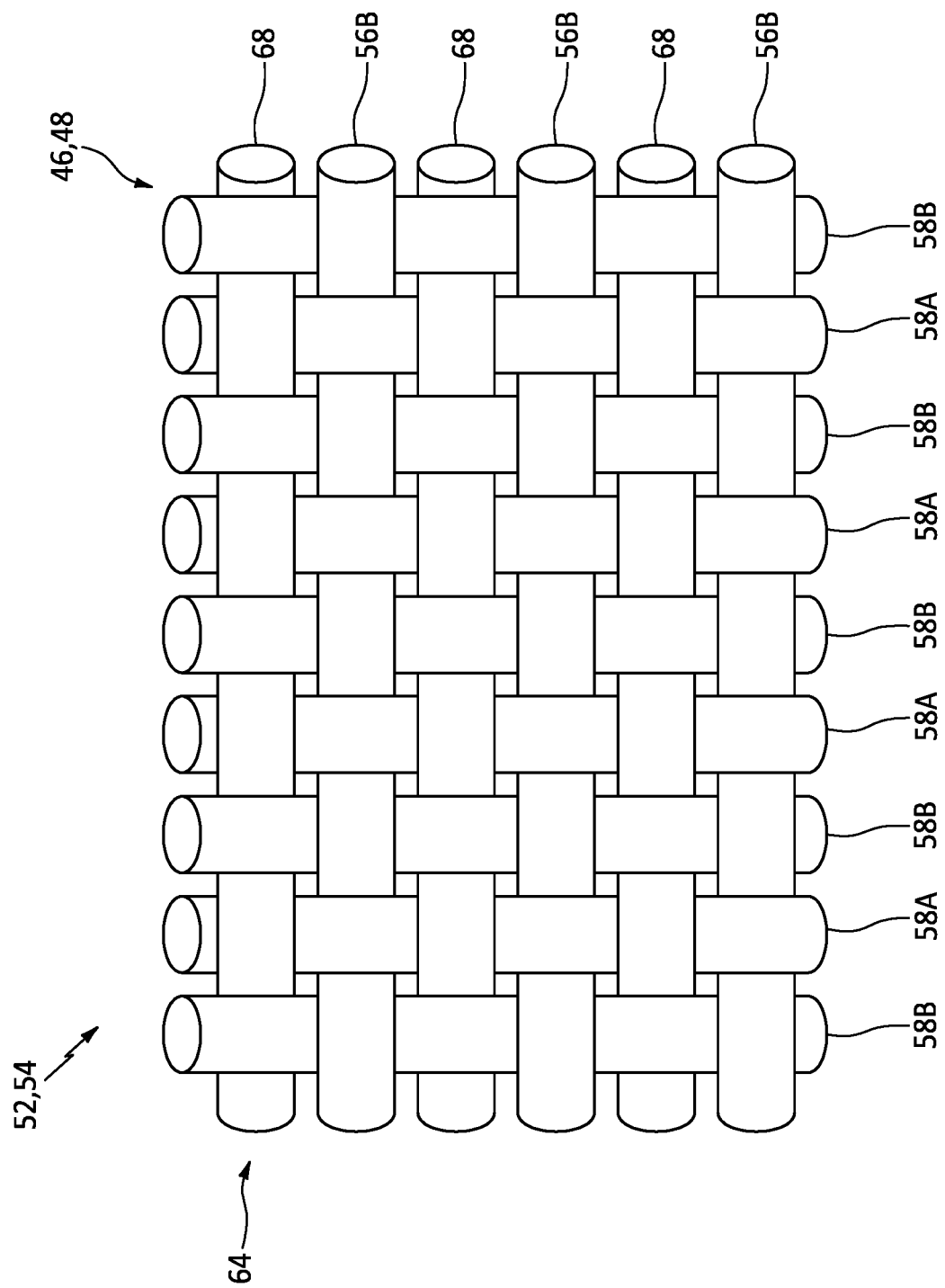

Referring to FIGS. 5A and 5B, the electric heating elements 68 are integrated with the reinforcement material 48 and embedded within the matrix 50 (see FIG. 3). Each of the electric heating elements 68 of FIGS. 5A and 5B, for example, is woven into the reinforcement material cloth 54 with the reinforcement material fibers (e.g., 56 and 58) in at least one or more of the body layers 46; e.g., one or more of the outermost body layers (e.g., 46 and/or 46B and/or 46C) of FIG. 3. Each electric heating element 68 of FIG. 5A, for example, may be arranged with and follow a respective one of the weft fibers 56 (or one of the warp fibers 58). Each electric heating element 68 of FIG. 5A, for example, may be woven into the reinforcement material cloth 54 with the respective weft fiber 56 (or warp fiber 58). Alternatively, referring to FIG. 5B, one or more of the weft fibers 56 (or the warp fibers 58) may be replaced by respective electric heating elements 68. Each electric heating element 68 of FIGS. 5A and 5B therefore may cross above (or below) one or more or all of the first warp fibers 58A and may cross below (or above) one or more or all of the second warp fibers 58B, or vice versa where the electric heating elements 68 follow and/or replace one or more of the warp fibers 58. With such arrangements, each electric heating element 68 may project through one or more interstices in the reinforcement material cloth 54, where each of the interstices is formed between respective crossing reinforcement material fibers (e.g., 56 and 58). Various other techniques, of course, may also or alternatively be used to integrate the electric heating elements 68 into the composite airfoil 22 and its reinforcement material 48.

A ratio of the reinforcement material fibers (e.g., 56 and 58) to the electric heating elements 68 within one or more or all of the body layers 46 may be between 1:10 and 1:100, between 1:100 to 1:500, or between 1:500 and 1:1000. Referring to FIG. 3, the reinforcement fiber to heating element ratio may be the same of each of the layers 46 in which the electric heating elements 68 are included. Alternatively, a layer (e.g., 46A) closer to the airfoil exterior surface 62 may have a higher reinforcement fiber to heating element ratio than a layer (e.g., 46B) farther away from the exterior surface 62, or vice versa.

Figure 6:
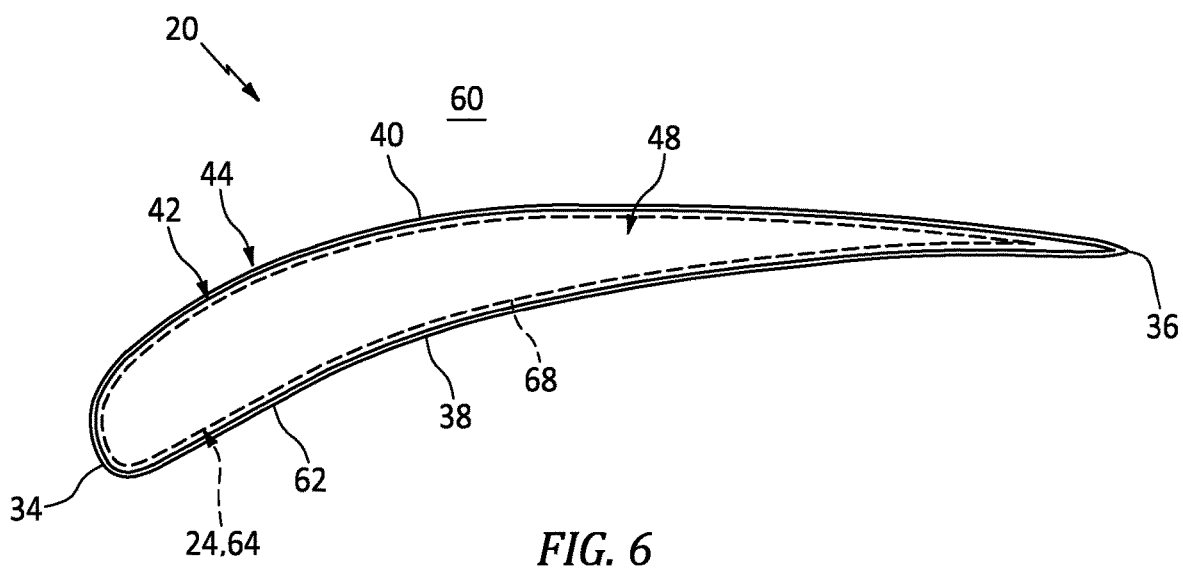
FIG. 6 is a schematic sectional illustration of the composite airfoil with another electric heater arrangement.

Referring to FIG. 6, the electric heater 64 and its electric heating elements 68 (see also FIGS. 5A and 5B) may be integrated into the composite airfoil 22 and its reinforcement material 48 to provide anti-icing for an entire exterior periphery of the composite airfoil 22. Alternatively, referring to FIG. 2, the electric heater 64 and its electric heating elements 68 (see also FIGS. 5A and 5B) may be integrated into the composite airfoil 22 and its reinforcement material 48 to provide anti-icing for a select portion or portions of the exterior periphery of the composite airfoil 22. The electric heater 64 of FIG. 2, for example, is configured to provide anti-icing for a portion of the airfoil exterior surface 62 at/along a portion or an entirety of the airfoil leading edge 34 and a portion of the airfoil exterior surface 62 at/along a portion or an entirety of the airfoil pressure side 38.

Figure 7A:
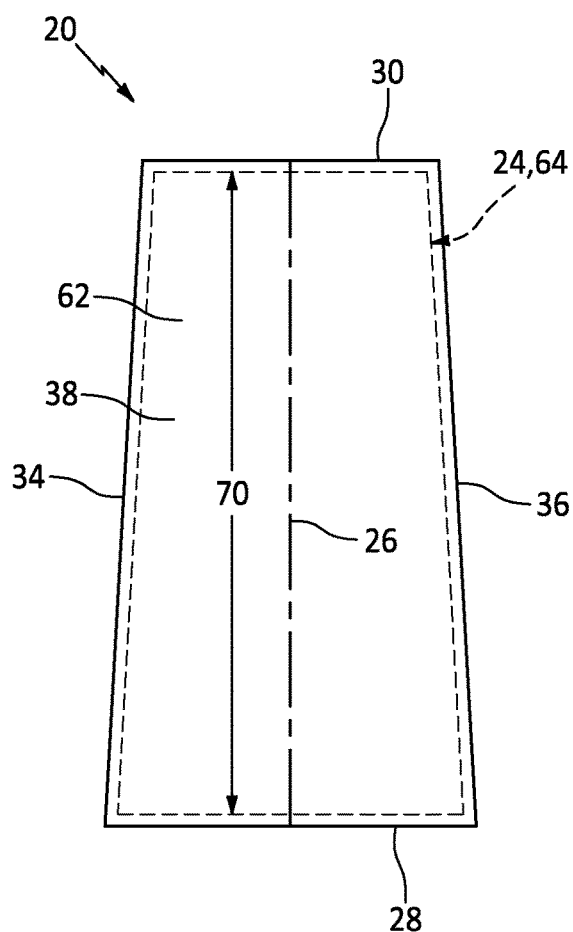
FIGS. 7A and 7B are schematic side illustrations of various electric heater arrangements with the composite airfoil.

Referring to FIG. 7A, the electric heater 64 may provide anti-icing along a length 70 of the span 26 that is, for example, equal to or greater than a threshold percentage of the span 26, where the threshold percentage may be fifty percent, seventy-five percent or ninety-five to one hundred percent. The electric heater 64 of FIG. 7A, for example, may focus its anti-icing capability along substantially the entire span 26 of the airfoil exterior surface 62. This arrangement may be useful where, for example, the composite airfoil 22 is substantially stationary during operation; e.g., where the composite airfoil 22 is configured as or otherwise part of a fixed or variable (e.g., pivotably) stator vane. However, the arrangement of FIG. 7A may also be useful where the composite airfoil 22 is configured as or otherwise part of a rotor blade.

Figure 7B:
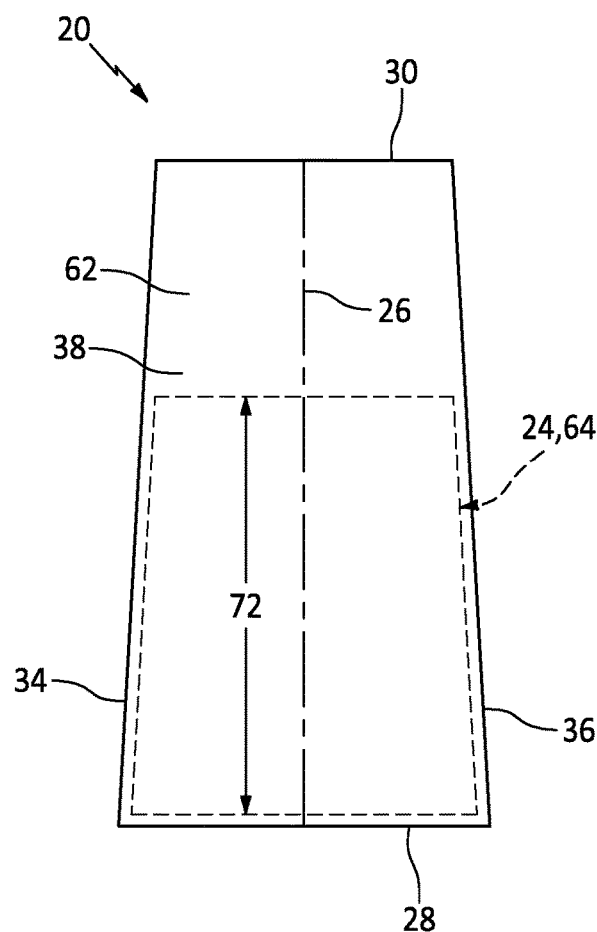

Referring to FIG. 7B, the electric heater 64 may alternatively provide anti-icing along a length 72 of the span 26 that is less than the threshold percentage. The electric heater 64 of FIG. 7B, for example, focuses its anti-icing capability on a region of the airfoil exterior surface 62 adjacent/proximate the airfoil base 28. This arrangement may be useful where, for example, the composite airfoil 22 moves (e.g., rotates about a rotational axis) during operation; e.g., where the composite airfoil 22 is configured as or otherwise part of a rotor blade. When rotating, for example, ice may be more likely to accumulate proximate the airfoil base 28 than the airfoil tip 30 since a high rotational velocity at the airfoil tip 30 is more likely to prevent ice accumulation and/or eject accumulated ice. However, the arrangement of FIG. 7B may also be useful where the composite airfoil 22 is configured as or otherwise part of a variable (e.g., pivotably) stator vane. In particular, reducing or preventing ice accumulation proximate the airfoil base 28 may reduce or prevent impedance to movement of the variable stator vane.

In some embodiments, referring to FIGS. 2 and 6, the electric heater 64 and one or more of its electric heating elements 68 may also be configured as part of a lightening protection system. The composite airfoil 22 may thereby accommodate lightening strikes to the aircraft propulsion system.

Figure 8:
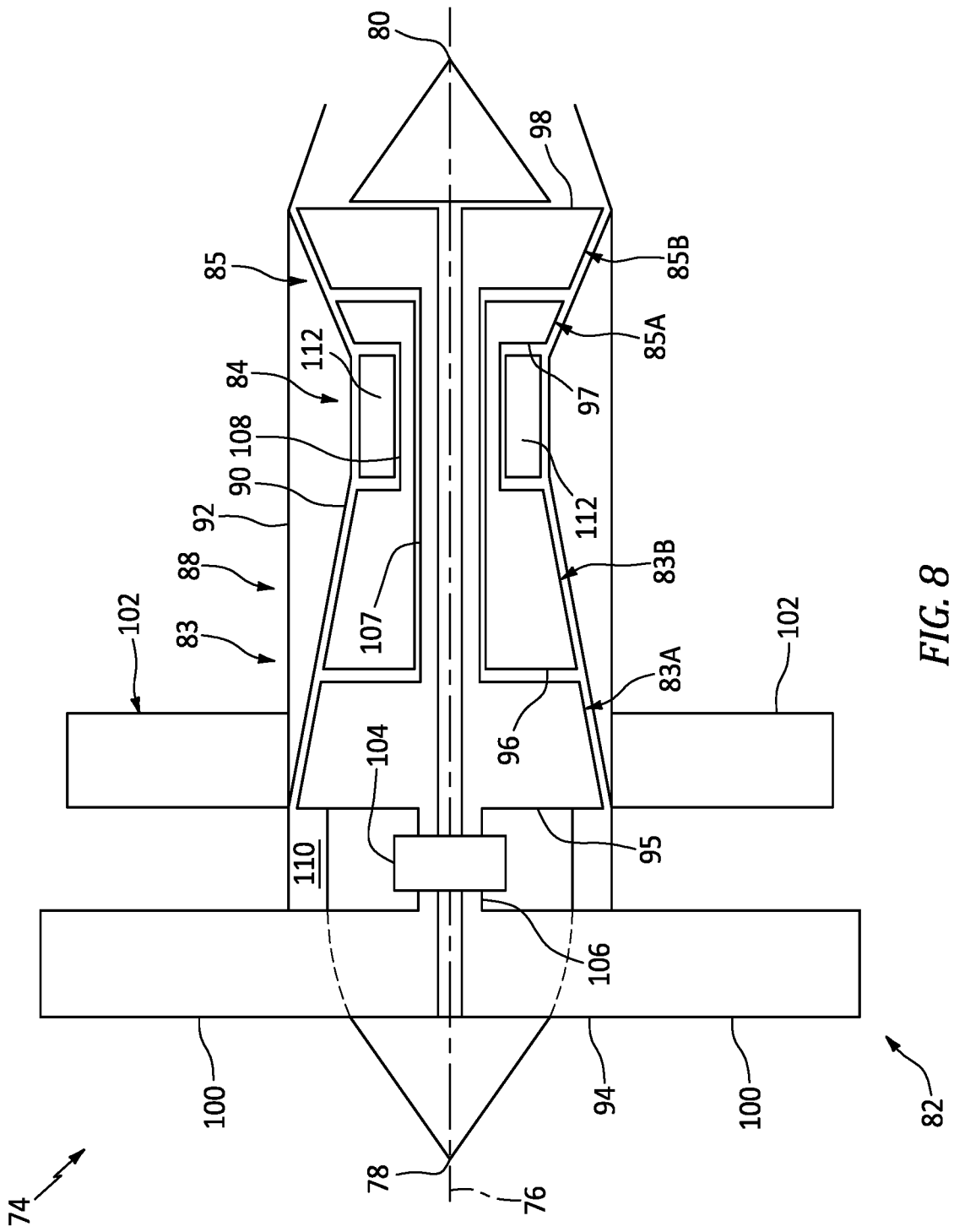
FIG. 8 is a schematic sectional illustration of an open rotor aircraft propulsion system.

Various type of aircraft propulsion systems may be configured with one or more arrays of the composite airfoils 22. An example of such an aircraft propulsion system is shown in FIG. 8, which propulsion system is configured as an open rotor aircraft propulsion system 74 with a tractor propulsor. This propulsion system 74 of FIG. 8 extends axially along an axial centerline 76 between a forward, upstream end 78 and an aft, downstream end 80. The propulsion system 74 includes a propulsor (e.g., an un-ducted fan) section 82, a compressor section 83, a combustor section 84 and a turbine section 85. The compressor section 83 includes a low pressure compressor (LPC) section 83A and a high pressure compressor (HPC) section 83B. The turbine section 85 includes a high pressure turbine (HPT) section 85A and a low pressure turbine (LPT) section 85B.

The engine sections 82-85B are arranged sequentially along the centerline 76 between the upstream end 78 and the downstream end 80. The propulsor section 82 is configured outside of an engine housing 88 at an exterior of the propulsion system 74. The engine sections 83A-85B are arranged within the engine housing 88. This engine housing 88 includes a case 90 and a nacelle 92. The case 90 houses one or more of the engine sections 83A-85B; e.g., an engine core. The nacelle 92 houses and provides an aerodynamic cover for the case 90.

Each of the engine sections 82, 83A, 83B, 85A and 85B includes a respective bladed rotor 94-98. Each of these bladed rotors 94-98 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Each open rotor blade 100 (e.g., propulsor blade) of the propulsor rotor 94 of FIG. 8 may include a respective composite airfoil 22; e.g., see FIG. 1. Each (e.g., fixed or variable) open guide vane 102 of FIG. 8 arranged outside of the engine housing 88 and downstream of the propulsor section 82 and its blades 100 may also or alternatively include a respective composite airfoil 22; e.g., see FIG. 1. These open guide vanes 102 may be particularly susceptible to icing given their exposure to ambient conditions and close downstream position to the open rotor blades 100.

The propulsor rotor 94 is connected to a gear train 104, for example, through a propulsor shaft 106. The gear train 104 and the LPC rotor 95 are connected to and driven by the LPT rotor 98 through a low speed shaft 107. The HPC rotor 96 is connected to and driven by the HPT rotor 97 through a high speed shaft 108.

During operation, an inner stream of air propelled by the propulsor rotor 94 enters a core flowpath 110 within the aircraft propulsion system 74. This core flowpath 110 extends sequentially through the engine sections 83A-85B. The air within the core flowpath 110 may be referred to as core air. This core air is compressed by the LPC rotor 95 and the HPC rotor 96 and directed into a combustion chamber 112 of a combustor in the combustor section 84. Fuel is injected into the combustion chamber 112 and mixed with the compressed core air to provide a fuel-air mixture. This fuel-air mixture is ignited and combustion products thereof flow through and sequentially cause the HPT rotor 97 and the LPT rotor 98 to rotate. The rotation of the HPT rotor 97 and the LPT rotor 98 respectively drive rotation of the HPC rotor 96 and the LPC rotor 95 and, thus, compression of the air received from a core airflow inlet. The rotation of the LPT rotor 98 also drives rotation of the propulsor rotor 94, which propels an outer stream of air outside of the engine housing 88 thereby bypassing the engine core. The propulsion of the outer stream of air may account for a majority of thrust generated by the propulsion system 74, e.g., more than seventy-five percent (75%) of thrust. The propulsion system of the present disclosure, however, is not limited to the foregoing exemplary thrust ratio.

While the composite airfoils 22 may be arranged at an exterior of an aircraft propulsion system as described above, the composite airfoils 22 may also or alternatively be arranged within an interior of an aircraft propulsion system. The composite airfoils 22, for example, may alternatively be configured as fan blades within a ducted fan section of a turbofan propulsion system. In another example, the composite airfoils 22 may alternatively be configured as inlet guide vanes within an inlet to a turbojet propulsion system. The present disclosure therefore is not limited to exterior airfoil applications. Furthermore, the composite airfoils 22 can also be included in various types of aircraft propulsion systems other than those described above; e.g., a pusher fan propulsion system, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft propulsion system, comprising:
    an airfoil comprising a fiber-reinforced composite and an exterior surface, the fiber-reinforced composite comprising a plurality of fibers embedded within a matrix; and
    a thermal anti-icing system, the thermal anti-icing system including an electric heater, the electric heater comprising a conductive filament, the electric heater configured to melt and/or prevent ice accumulation on the exterior surface, and the conductive filament integrated with the plurality of fibers and embedded within the matrix,
    wherein the conductive filament is integrated with the plurality of fibers as an addition to all of the plurality of fibers, and
    wherein the conductive filament is arranged with and follows a respective fiber of the plurality of fibers.

2. The apparatus of claim 1, wherein the conductive filament is woven with the plurality of fibers into a weave, and the weave is embedded within the matrix.

3. The apparatus of claim 1, wherein the conductive filament is integrated into a cloth formed from the plurality of fibers, and the cloth is embedded within the matrix.

4. The apparatus of claim 1, wherein
    the plurality of fibers includes a first fiber, a second fiber and a third fiber, the first fiber is parallel with the second fiber, and the third fiber is parallel with the conductive filament;
    a first portion of the third fiber is above and crosses the first fiber, and a second portion of the third fiber is below and crosses the second fiber; and
    a first portion of the conductive filament is below and crosses the first fiber, and a second portion of the conductive filament is above and crosses the second fiber.

5. The apparatus of claim 1, wherein
    the plurality of fibers are woven together; and
    the conductive filament passes through interstices between the plurality of fibers.

6. The apparatus of claim 1, wherein
    the conductive filament is one of a plurality of conductive filaments integrated with the plurality of fibers and embedded within the matrix; and
    a ratio of the plurality of fibers to the plurality of conductive filaments is between 1:10 and 1:1000.

7. The apparatus of claim 1, wherein
    the electric heater is configured to melt and/or prevent ice accumulation on the exterior surface along a length of a span of the airfoil; and
    the length is equal to or greater than seventy-five percent of the span.

8. The apparatus of claim 1, wherein
the electric heater is configured to melt and/or prevent ice accumulation on the exterior surface along a length of a span of the airfoil; and
the length is less than seventy-five percent of the span.

9. The apparatus of claim 1, wherein the electric heater is configured to melt and/or prevent ice accumulation on the exterior surface along a leading edge of the airfoil.

10. The apparatus of claim 1, wherein the electric heater is configured to melt and/or prevent ice accumulation on the exterior surface along a pressure side of the airfoil.

11. The apparatus of claim 1, wherein the plurality of fibers comprise at least one of fiberglass fibers, carbon fibers or aramid fibers.

12. The apparatus of claim 1, wherein the matrix comprises a polymer matrix.

13. The apparatus of claim 1, wherein
the airfoil comprises a body and a protective coating over at least a portion of the body;
the body comprises the fiber-reinforced composite; and
the protective coating forms the exterior surface.

14. The apparatus of claim 1, further comprising a rotor blade comprising the airfoil.

15. The apparatus of claim 1, further comprising a guide vane comprising the airfoil.

16. The apparatus of claim 1, wherein
the aircraft propulsion system is configured as an open rotor aircraft propulsion system; and
the airfoil is arranged at an exterior of the open rotor aircraft propulsion system.

17. An apparatus for an aircraft propulsion system, comprising:
an airfoil comprising an exterior surface, a matrix and a sheet of a plurality of woven fibers within the matrix; and
a thermal anti-icing system, the thermal anti-icing system including an electric heater, the electric heater configured as a metal wire, the electric heater configured to melt and/or prevent ice accumulation on the exterior surface, and the metal wire integrated with the sheet of the plurality of woven fibers and disposed within the matrix,
wherein the metal wire is integrated with the sheet of the plurality of woven fibers as an addition to all of the plurality of woven fibers, and
wherein the metal wire is arranged with and follows a respective woven fiber of the plurality of woven fibers.

18. A system, comprising:
an open rotor aircraft propulsion system comprising an open propulsor rotor, an open guide vane and a thermal anti-icing system, the thermal anti-icing system including an electric heater;
the open guide vane arranged downstream of the open propulsor rotor, the open guide vane comprising an airfoil, the airfoil arranged at an exterior of the open rotor aircraft propulsion system, and the airfoil comprising a fiber-reinforced composite and an exterior surface, the fiber-reinforced composite comprising a plurality of fibers embedded within a matrix; and
the electric heater configured to melt and/or prevent ice accumulation on the exterior surface, and the electric heater comprising a conductive filament integrated with the airfoil,
wherein the conductive filament is integrated with the airfoil as an addition to all of the plurality of fibers, and
wherein the conductive filament is arranged with and follows a respective fiber of the plurality of fibers.

* * * * *